United States Patent [19]

Brumagim

[11] 3,919,087
[45] Nov. 11, 1975

[54] CONTINUOUS PRESSURE FILTERING AND/OR SCREENING APPARATUS FOR THE SEPARATION OF LIQUIDS AND SOLIDS

[75] Inventor: Ivan S. Brumagim, North Warren, Pa.

[73] Assignee: Secondary Processing Systems, Warren, Pa.

[22] Filed: May 20, 1974

[21] Appl. No.: 471,330

Related U.S. Application Data

[63] Continuation of Ser. No. 274,881, July 25, 1972, abandoned.

[52] U.S. Cl. ............................... 210/350; 210/415
[51] Int. Cl.² ........................................ B01D 25/38
[58] Field of Search .................. 100/117, 145–150, 100/211; 210/218, 350, 351, 415

[56] References Cited
UNITED STATES PATENTS

| | | | |
|---|---|---|---|
| 1,772,262 | 8/1930 | Naugle | 210/415 X |
| 2,783,498 | 3/1957 | Richardson | 210/415 UX |
| 3,154,007 | 10/1964 | Schaub et al. | 100/147 |
| 3,322,283 | 5/1967 | Babunovic et al. | 210/415 X |
| 3,518,936 | 7/1970 | Bredeson | 100/117 |
| 3,695,173 | 10/1972 | Cox | 210/415 UX |

*Primary Examiner*—Thomas G. Wyse
*Assistant Examiner*—Robert H. Spitzer

[57] ABSTRACT

An apparatus for deliquefying solids is disclosed herein. The device is made up of three separate functional areas consisting of a cylindrical screen disposed between a first (inlet) cylinder and a second (compression) cylinder. The screen has a third concentric cylinder around it with a drain at the bottom. The screen and two cylinders are all of the same inside diameter. A screw runs through the first cylinder, the screen, and into the compression cylinder and the shaft of the screw extends through the compression cylinder. An annular piston is supported on the shaft in the second cylinder and is urged toward the screen by a helical spring. When the liquefied solids are fed into the first chamber, the screw moves them along the inner surface of the cylindrical screen through which the liquor is hydraulically expelled. The screw then pushes the solids retained on the screen into the second cylinder where it mechanically compresses and compacts the solids sufficiently to form a solid plug of sufficient length and compactness to effect a liquor tight seal along the inner shell of the compression chamber. The thrust of the solids being thus pushed against the piston deflects the spring and pushes the annular piston out of the compression cylinder so that the solids are extruded between the compression cylinder and the annular piston. The tension on the spring is adjustable to insure the formation of a liquid tight solid plug.

6 Claims, 1 Drawing Figure

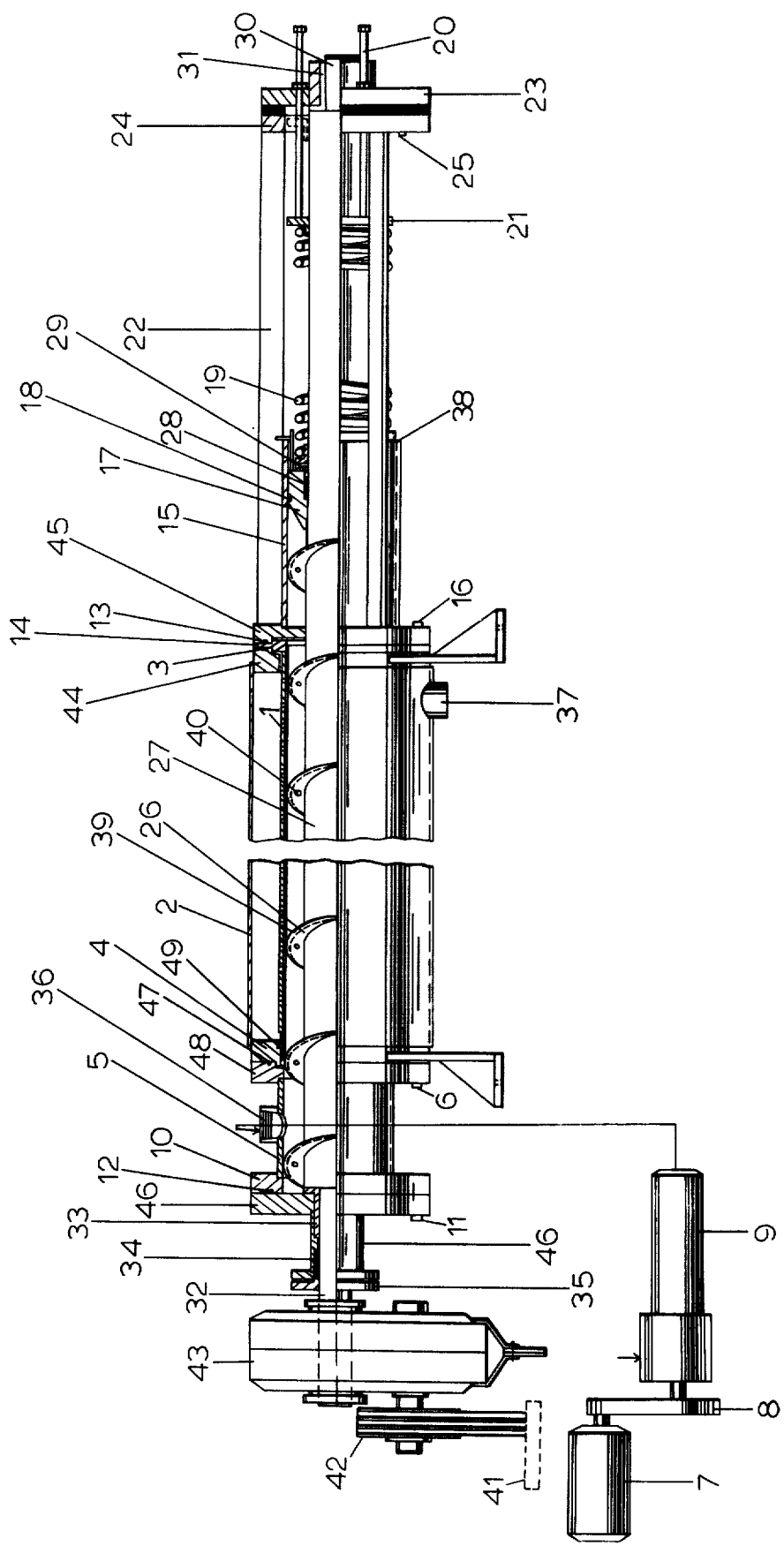

CONTINUOUS PRESSURE FILTERING AND/OR SCREENING APPARATUS FOR THE SEPARATION OF LIQUIDS AND SOLIDS

This is a continuation, of application Ser. No. 274,881, filed July 25, 1972 now abandoned.

REFERENCE TO PRIOR ART

U.S. Pat. No. 1,772,262 shows a filtering means made up of an inlet, a screw, a conical compression chamber, and a conical closure. The closure is supported on a threaded sleeve 39 so that the discharge orifice can be varied. This apparatus would be impractical since a workman would have to constantly adjust the handwheel to take care of varying solids or the device would jam.

U.S. Pat. No. 3,154,007 has no compression chamber, and the solids would be discharged with part of the liquids.

U.S. Pat. No. 3,322,283 would operate only in a vertical position. There is no compression chamber, and the screw would merely convey the solids out window 44 after the liquid had settled out.

GENERAL DESCRIPTION OF THE INVENTION

In the apparatus disclosed herein the solids-liquid slurry is pumped by means of a pump capable of developing up to several hundred pounds of hydraulic pressure into a jacketed cylinder, the inner shell of which is a screen-filter complex designed to withstand the hydraulic pressure. A screw of a diameter to turn closely within said complex removes the solids built up thereon and moves them toward the discharge end of the cylinder. The outside diameter of the screw versus the inside diameter of the filter complex determines the depth of filter cake permitted to accumulate on the filter complex.

In addition to controlling the thickness of filter cake, a more important function of the screw is to move the excess solids toward the discharge end of the apparatus and there compact them against the resisting force of a preloaded piston movable under pressure lengthwise within an evacuation chamber. A preferable method of preloading the piston is the use of a coil spring whose resistance increases with the depth of its compression. Thus, a combination of an adequate length of evacuation chamber, with a sufficient spring strength can be provided to form a solid plug of sufficient length and compactness to effect a liquor tight seal along the inner shell of the compression chamber. As the compacted solids build up along the discharge end of the screw they increasingly transmit the thrust of the screw, overcoming the counteracting spring load and moving the piston finally to a point sufficiently outside the evacuation chamber to affect the extrusion of the compacted solids between the outer periphery of the piston and the lip of the evacuation chamber.

The liquor is forced by the hydraulic pressure through the accumulated solids and the screen and/or filter complex into the jacket from which it is piped for further processing.

This apparatus can be used on any liquid-solid slurry which can be hydraulically pumped. A heavy concentration of solids reacts more quickly to force the piston outward whereas a small concentration will not move the piston until sufficient solids are collected and compacted to transmit the thrust of the screw and actuate the piston. Thus the apparatus adjusts itself to substantially all variations of moisture content in the slurry to be filtered.

The moisture content of the extruded materials is roughtly in inverse proportion to the counteracting pressure on the piston. This depends on the size and strength of the spring and is further adjusted by accessible means to pre-compress the spring.

The solids content of the liquid effluent is controlled by the make-up of the filter and/or screen complex and the predetermined thickness of the filter cake.

Presently, there are many types of continuous vacuum filters and several types of hydraulic pressure filters for batch-wise operation, but there appears to be no satisfactory continuous screening and/or filtering apparatus in which the liquid is expelled by hydraulic pressure and the solids separately collected, compacted and extruded by mechanical means.

To overcome this deficiency, it is necessary to provide:

1. Means to provide flow of solids-liquid mixture under hydraulic pressure into the screen and/or filter complex.
2. A cylindrical screen and/or filter complex (hereinafter called the complex) to withstand said hydraulic pressure.
3. Means to continuously remove or control the thickness of deposited solids built up on the inner surface of the complex.
4. Means to continuously thrust the accumulated solids toward the discharge end of the complex.
5. Means to continuously collect and dispose of the liquid effluent from the complex.
6. Means to continuously segregate and compress the solids within a compression chamber sufficiently to form a solid plug of sufficient length and compactness to effect a liquor tight seal along the inner shell of the compression chamber.
7. Means to continuously extrude the retained solids without loss of liquid.
8. Means to continuously control the moisture content of the extruded solids.

The flow of the liquid-solids mixture is provided by a hydraulic pump such as the Moyno pump. The filter complex is a cylinder, forming the inner shell of a jacketed vessel, removably sealed at both ends to prevent liquid leakage. This complex is designed to withstand the hydraulic working pressure required.

The means of controlling the depth of filter cake and removing the excess solids retained on the complex surface is preferably a conventional screw turning at an optimum speed. The diameter of the screw versus the inside diameter of the complex predetermines the depth of filter cake to be built up to affect efficient filtration. The excess of solids is removed by the action of the screw, which scrapes said excess off the surface of the filter cake and thrusts it toward the discharge end of the cylinder. The liquid effluent is collected in the jacket surrounding the complex from where it is piped to equipment for its disposal or further processing. A most important function of the screw is to crowd the excess solids into the discharge end of the cylinder where as they are more and more compressed they increasingly transmit the thrust of the screw against the counteracting force of the spring loaded piston. The compression chamber adjacent the cylinder must be of sufficient length to ensure the formation of a sealing plug of compressed solids of sufficient compactness and length to effect a liquid tight seal between said plug and the chamber wall. If the solids are erosive or abrasive, the chamber should be lengthened so that the screw extends into the chamber through the length of its major thrust and thus protect the complex from excessive wear and tear. The action of the screw within the compacted solids finally forces the piston out of the chamber to the point where the solids are extruded between the piston and the lip of the chamber. The degree of compaction being in inverse proportion to the moisture content, the counteracting load on the piston is varied to control the moisture content of the extruded material. The solids are accumulated by conventional means for further processing.

The prior art does not extend itself to a continuous screening and/or filtering apparatus, in which the separation of the liquors is accomplished primarily by hydraulic pressure within a separate screening chamber and the separation, accumulation, compacting and evacuation of the solids are accomplished by mechanical pressure in a separate compresssion chamber.

OBJECTS OF THE INVENTION

The object of this invention is to provide an improved apparatus for continuously filtering and/or screening in which positive hydraulic pressure is the primary force affecting the movement of liquors through a screen/filter medium and a separate positive mechanical pressure is the primary force affecting the accumulation and evacuation of the solids.

Another object of this invention is to provide a continuous filtering and/or screening machine (hereinafter called an apparatus) in which the filter and screen complex (hereinafter called the complex) is the inner shell of a jacketed cylinder with said complex designed to withstand substantial hydraulic pressure differentials.

Another object of this invention is to provide an apparatus in which the filtrate is forced through said complex and the solids are retained on the inner surface thereof.

Another object of this invention is to provide an apparatus in which a rotating device, preferably a screw, is positioned to scrape away the excess of solids retained on the inner surface of the complex so as to provide a predetermined and uniform thickness of such deposits as a filtering medium, (hereinafter called the filter cake) said uniform thickness to be variable from an infinitely small to a substantial amount.

Another object of this invention is to provide an apparatus in which a rotating device, preferably a screw, is positioned to thrust the excess of solids retained on the filter cake toward the discharge end of the apparatus.

Another object of this invention is to provide an apparatus in which a rotating device, preferably a screw, is positioned with an adequate source of torque to solidly compress the excess of solids in a separate compression chamber remote from the screening area.

Another object of this invention is to provide an apparatus in which a compression chamber equipped with a piston, preferably spring loaded, is positioned immediately adjacent to the discharge end of the complex, to provide the necessary counteracting force to accomplish the compression of the solids.

Another object of this invention is to provide an apparatus in which a rotating device, preferably a screw, is positioned with the necessary additional torque to compress the solids within the evacuation chamber sufficiently to form a positive liquid tight seal between the compressed solids and the chamber wall.

Another object of this invention is to provide an apparatus in which a rotating device, preferably a screw, is positioned with adequate torque to sufficiently compact the solids to develop and transmit the thrust necessary to overcome the counteracting force, drive the piston to the end of the evacuation chamber and extrude the solids between the periphery of the piston and the lip of the chamber.

Another object of this invention is to provide an apparatus, in which the counteracting force applied to the piston is preferably an adjustable spring or a hydraulic means.

Another object of this invention is to provide an apparatus in which the length of piston stroke is adequate to ensure the formation of a plug of compacted solids sufficient in length and compactness to affect a positive liquid seal between such plug and discharge chamber wall.

Another object of this invention is to provide an apparatus, in which a rotating device, preferably a screw, extends one or more diameters beyond the complex into the compression chamber so that the plug of compacted solids is formed substantially outside the complex, thereby relieving the complex of the wear and tear resulting from the counteraction between the screw and the compacted plug.

Another object of this invention is to provide an apparatus, in which filtration is accomplished primarily by hydrauic thrust within the screened complex simultaneously with the continuous accumulation, compaction and extrusion of the solids deposits by mechanical means within the compression chamber.

Another object of this invention is to provide an apparatus in which, in the case that no build-up of filter cake can be allowed on the surface of the complex, the outside diameter of the screw is extended to make an interference fit within the inside diameter of the complex by the addition of a flexible and non-wearing strip of material, such as silicone, or rubber, fixed to the thrust faces of the screw so as to extend sufficiently beyond the screw diameter to affect moderate interference with the complex and thus remove substantially all the retained solids at each revolution of the screw.

Another object of this invention is to provide an apparatus, in which the shaft of the rotating member (screw) is accurately rotatably fixed by radial thrust bearings at each end of the apparatus to ensure a uniform clearance between the outside diameter of the screw and the inside diameter of the complex.

Another object of this invention is to provide an apparatus, in which the force resisting the outward movement of the piston can be adjusted in order that the moisture content of the evacuated solids can be predetermined and consistently maintained.

With the above and other objects in view, the present invention consists of the combination and arrangement of parts hereinafter more fully described, illustrated in the accompanying drawings and more particularly pointed out in the appended claims, it being understood that changes may be made in the form, size, proportions and minor details of construction without departing from the spirit or sacrificing any of the advantages of the invention.

GENERAL DESCRIPTION OF THE DRAWING

The drawing shows a view partly in cross section showing the elements of equipment which make up the apparatus in which a mixture of solids and liquids are continuously screened and/or filtered under a combination of hydraulic and mechanical pressures.

DETAILED DESCRIPTION OF THE DRAWING

Referring now to the drawing, motor 41 drives gear reducer 43 through V-belt 42, gear reducer 43 drives screw 26, rotating within and a part of continuous filtering and/or screening machine, screw 26 mechanically accumulates and compacts the solids retained on the filter and/or screen complex and continuously extrudes them at the end 38 of cylinder 15. Motor 7 drives hydraulic pump 9 through V-belt 8 to force the liquid-solids mixture through inlet 36 into cylinder 5. The liquid is forced through outlet 37 for further processing.

The screen and/or filter complex 1 has flange 14 on one end inserted into an inwardly flanged cylinder 2 which has flanges 4 and 44 on its opposite ends. The end of the cylindrical screen slides into flange 4. Flange 4 and complex 1 are sealed by O-ring 49. Cylinder 5 has flanges 48 and 10 fixed to its opposite ends. Flange 48 is bolted to flange 4. Cap screws 6 connect flanges 4 and 48. Flanges 4 and 48 are sealed by O-ring 47. Bearing housing 46 is bolted to flange 10 by bolts 11 and sealed by O-ring 12. Flange 14, which is fixed to screen 1 is sandwiched by cap screws 16 between flange 44 and flange 45. These joints are sealed by O-rings 3 and 13 as shown. Cylinder 15 is bored and finished to receive annular piston 17, which is sealed on its outside diameter by O-ring 18 received in a suitable annular groove. Piston 17 is forced into the bore of cylinder 15 by coil spring 19. Spring 19 is compressed as required by jack bolts 20 acting on retaining plate 21. Four circumferentially spaced bars 22 are fixed to chamber 15. End flange 24 is fixed to support bars indicated at 22 which are fixed to flange 45. Bearing housing 23 is bolted to flange 24 by bolts 25. Screw 26 rotates within cylinder 5, screen 1 and cylinder 15. Screw 26 is fixed to a hollow shaft 27, which extends through cylinder 5, screen 1, evacuation chamber made up of cylinder 15, and coil spring 19. Hollow shaft 27 has the part of its outer periphery that extends through cylinder 15, machine finished, and packing 28 slides on the machined surface of shaft 27. Packing 28 is compacted by gland 29. Solid shaft 30 is fixed into the end of hollow shaft 27. Shaft 30 rotates within radial thrust bearing 31. Radial thrust bearing 31 is pressed into bearing housing 23. Turning now to the opposite end, shaft 32 is fixed into the end of hollow shaft 27 and rotates within radial thrust bearing 33. Packing 34 compacted by gland 35 seals the shaft 32 from pressure leakage. Shaft 32 extends to connect with a conventional drive as shown.

The material to be separated is pumped through inlet 36 into cylinder 5 and the complex, made up of screen 1 and cylinder 5, where the liquor is forced through the screen 1 into cylinder 2 and out through outlet 37. The solids are retained on the inner surface of screen 1. The diameter of screw 26 is predetermined to give a selected clearance between the screw and inner surface of screen 1 from an interference fit to a fraction of an inch. Any excess of solids beyond the selected clearance is removed and forced toward evacuation chamber made up of cylinder 15 by the action of screw 26. The solids are thus accumulated toward the discharge end of screen 1 where they are compacted sufficiently to transmit the thrust of screw 26 and force piston 17 toward the discharge end of evacuation chamber 15. The counteracting pressure of spring 19 increases as piston 17 is moved toward the point of discharge and reaches a point of maximum solids compaction when piston 17 clears the lip 38 of evacuation chamber 15. At this point the compacted solids are extruded between the outer periphery of piston 17 and chamber lip 38. The moisture content and compaction of the solids are controlled by the selected size and strength of spring 19 and the amount of spring preload as adjusted by jack screws 20.

The solids content of the filtrate is controlled by the preselection of the screen and/or filter complex 1, the thickness of the filter cake predetermined by the clearance between screw 26 and the inner surface of screen 1 and the natural characteristics of the mixture to be processed.

In the case that the characteristics of the solids are such that a mechanical cleaning of the surface of screen 1 is necessary, the leading faces of screw 26 are provided with silicone or rubber sheets 39 riveted to screw 26 by rivets 40; sheets 39 are cut to extend the outside diameter of screw 26 to provide a moderate interference fit within complex 1. By this means the inner surface of screen 1 can be mechanically cleaned at each revolution of screw 26, that is, about once every second.

By the use of this novel combination of the use of hydraulic pressure to expel filtrate through a cylindrical screening and/or filtering complex and the use of rotating means arranged within such complex to simultaneously accumulate, compress and extrude the retained solids, the several objects of this invention are accomplished.

It should be understood that the foregoing disclosure describes a specific embodiment of the invention and that numerous modifications and alterations may be made therein without departing from the spirit and scope of the invention as set forth in the following claims.

The embodiments of the invention in which an exclusive property or privilege is claimed are defined as follows:

1. An apparatus for continuous separation of liquids and solids comprising,
   a cylindrical screen,
   a hollow compression cylinder in axial alignment with said cylindrical screen and having an inside diameter substantially equal to the inside diameter of said screen,
   means connecting said cylinder to said screen,
   a shaft extending through said screen and through said compression cylinder,
   a screw fixed to said shaft,
   said screw having an outside diameter adapted to rotate in close proximity to the inside of said screen,
   means to rotate said shaft,
   bearing means supporting each end of said shaft,
   support means fixed to said screw extending over said compression cylinder supporting one said bearing, a hollow axial cylindrical piston reciprocably received in said compression cylinder in close proximity to the inside diameter of said cylinder, said piston having a central bore slidably receiving said shaft, resilient means disposed around said shaft urging said piston into said cylinder, feed means for feeding liquid and solid fractions into said screen at the end thereof remote from said piston, said screen being adapted to allow said liquid to flow through said screen, retaining said solids in said screen, and means to collect said liquids as they flow through said screen, said screw being adapted to move said solids into said cylinder against said piston and to force said piston axially from said cylinder whereby some of said solids are extruded from said cylinder.

2. The apparatus recited in claim 1 wherein said means to collect said liquid comprises, a hollow outer cylinder disposed around said cylindrical screen providing a space therebetween, a drain connected to said outer cylinder for removing said liquid.

3. The apparatus recited in claim 2 wherein said resilient means is supported at its end remote from said piston by threaded rods, said threaded rods being adapted to move the end of said resilient means remote from said piston toward said screen complex whereby the tension on said resilient means in increased.

4. The apparatus recited in claim 2 wherein said outer cylinder has an annular flange attached to each end thereof, said annular flanges extending inward of said cylinder, said screen complex has a first and a second end, and said screen complex is supported at its first end in the inside diameter of one of said annular flanges, an O-ring on said annular flange forming sealing engagement with said screen complex, said first end of said complex has an outside surface and said annular flange has an O-ring disposed between said flange and said complex forming a seal between said complex and flange.

5. The apparatus recited in claim 2 wherein said screen complex comprises said cylindrical screen having an outwardly extending flange at one end, and said compression cylinder and said outer cylinder each have outwardly and inwardly extending flanges at one end respectively, said flange on said cylindrical screen is disposed between said flanges on said compression cylinder and said outer cylinder.

6. The apparatus recited in claim 2 wherein said resilient means includes a retaining plate having an opening therein received on said shaft, said retaining plate being disposed between said bearing means and said piston, and said resilient means further includes a spring resting on said plate, and threaded means on said bearing for selectively moving said plate toward and away from said compression cylinder.

* * * * *